United States Patent [19]

Alderman

[11] Patent Number: 4,578,542

[45] Date of Patent: Mar. 25, 1986

[54] LINE POWERED FLASHER CIRCUIT FOR RINGING SIGNAL

[76] Inventor: Robert J. Alderman, 3406 G-7 Ranch Rd., Ruskin, Fla. 33570

[21] Appl. No.: 607,784

[22] Filed: May 7, 1984

[51] Int. Cl.⁴ .......................................... H04M 11/02
[52] U.S. Cl. ............................. 179/84 L; 179/99 LS
[58] Field of Search ............... 179/84 L, 99 LS, 81 C; 315/241 P

[56] References Cited

U.S. PATENT DOCUMENTS 4,379,210  4/1983  Sparber ........................ 179/81 C X
4,430,602  2/1984  Ohmori ......................... 315/241 P

FOREIGN PATENT DOCUMENTS 31916   7/1981  European Pat. Off. .
1389607 5/1973  United Kingdom .

Primary Examiner—Gene Z. Rubinson
Assistant Examiner—James L. Dwyer
Attorney, Agent, or Firm—Jones & Askew

[57] ABSTRACT

A flasher circuit for providing intermittent pulses of light in response to the presence of a ringing signal on a telephone subscriber line. The circuit is powered solely from the energy available in a ringing signal on the telephone line and requires no external source of power. The circuit includes a voltage doubler (38, 39) arrangement for charging a storage capacitor (40). The voltage across the storage capacitor in turn is applied to a timing circuit (60, 62) which controls the triggering of a thyristor switch (55) which, when turned on, provides a high voltage output pulse from a pulse transformer (48). This pulse is applied to break down a xenon flash tube (45) of the type normally used in electronic photo flashes to provide a visible indication of the presence of a ringing signal on the phone line. The circuit provides multiple light pulses 12 during any given on interval (15) of the ringing signal on the telephone line. In one embodiment, a neon bulb (58) used as a voltage breakdown device, is optically coupled (70) to the xenon tube to provide photons to induce ionization of the xenon gas at a lower voltage.

11 Claims, 3 Drawing Figures

LINE POWERED FLASHER CIRCUIT FOR RINGING SIGNAL

TECHNICAL FIELD

The present invention relates to signaling devices in the field of telephony, and in particular discloses a telephone line powered flashing apparatus for providing a visual output in response to the presence of a ringing signal on the telephone line.

BACKGROUND OF THE INVENTION

Since its invention over a century ago, the telephone has become an essential tool of modern life. A tremendous amount of business, both commercial and personal, is conducted over the telephone in developed countries throughout the world.

However, as most people who conduct a large amount of their commercial business over the telephone are aware, the telephone is a mixed blessing of modern life. Many people after spending several days on the telephone at the office find it extremely annoying to have the telephone ringing at home in the evening. In order to isolate themselves from the telephone, many people have adopted expedients such as taking the telephone off-hook, disconnecting the telephone, and having all calls screened by an answering machine.

Furthermore, there are many circumstances in daily life in which the user of a telephone set desires to know when an incoming call is present on the line but for which the provision of an audible ringing signal can be extremely problematic. For example, if one has just successfully coaxed a fussy baby into going to sleep, the ringing of the telephone can reawake the child, compounding the general audible commotion within the home. Similarly, if one is engaged in recording or listening to live music, the sound of a telephone ringing interrupting such activity can be extremely annoying.

Conversely, many people can be in situations in which they wish to be alerted to the ringing of the telephone but in which the prevailing conditions make this difficult or impossible. For example, apartment dwellers who are also afficianadoes of loud music, often use headphones as a listening device. Extremely high sound pressure levels can be created within the confines of the headphone and it is often impossible for a person engaging in this activity to hear the ringing of the telephone. Also, the dial up telephone network is commonly used by hearing impaired or deaf people to communicate through forms of teletype machines. It is necessary to provide deaf but sighted people with a visual indication that the phone is ringing. There are also many industrial locations where high ambient noise levels make visual signaling for a ringing telephone desirable.

The present inventor is aware of prior art visual indicators responsive to the presence of a ringing signal on a telephone line. The context in which these devices have been seen is in arrangements for providing telecommunications for deaf people. Such specialized arrangements for deaf people normally include some form of incandescent lamp which is constantly or intermittently lighted in response to the presence of a ringing signal on a telephone line. This will normally be one of several lamps distinguishable by pulsing characteristic or color used to signal deaf people of the presence of signals which are normally provided as audible signals for persons with normal hearing. For example, the equivalent of the door bell in the house of a deaf person may be implemented in the form of turning on a light of a different color than the light which indicates the ringing of the telephone.

To the best of the inventor's knowledge, the prior art arrangements for providing visual indications that a ringing signal is present on a telephone line have included illumination devices provided with separate power sources and circuitry which corresponds to a conventional ring detect circuit such as might be used in a voice connecting arrangement for PBX to trigger illumination of the externally powered device. Devices of this type have also been used in high noise industrial environments.

Also, as most travelers are aware, many telephone sets on room extensions of hotel and motel private branch exchanges are equipped with a "message light". Many such arrangements for hotel message lights include polarity sensitive circuitry connected so that application of reverse battery supervision will cause the lamp to become constantly illuminated. Other arrangements have included ones for which breakdown devices (which may be external or may be embodied in the form of a neon lamp used for the message light) are used and the application of additional DC voltage to the extension line causes the lamp to become illuminated.

Under either of these circumstances, the common experience of most people is that the message lamps on such phone sets will flicker when the telephone rings. This normally occurs at a pulse repetition rate equal to the frequency of the ringing signal, or the frequency of the envelope of the ringing signal. Alternately, current in lamps under the circumstances of ringing will be induced when the contacts on the clapper alternately make and break, thus causing the light pattern on the message lamp to emulate the audible pattern provided by the ringer.

However, as most people are aware, the somewhat accidental occurrence of the flashing of the telephone message light in synchronism with the ringing puts out a low level of light and augments, rather than substitutes for, the provision of an audible ringing signal to persons with normal hearing. Conversely, in applications in which the visual indication of telephone ringing is of primary importance, such as in the home of a deaf person, the prior art has adopted the expedient of allowing a detected ring signal to switch on an externally powered lamp of some variety.

Thus it will be understood that prior art high light output illumination devices for indicating telephone ringing have tended to be specialized and expensive. They have not been practical for use by a person of normal hearing due to this fact and because they flash in a manner which might not draw the attention of a person of normal hearing who is not used to keeping a look-out for such a flash. Thus, the provision of light-emitting telephone ringing indicators for persons of normal hearing has not been practical or popular.

Furthermore, in an environment particularly designed for a person with impaired hearing, it is necessary to distribute lights in several locations. In the example of the flashing of the message light on a hotel telephone, it is well known that the low light output of such devices (should someone attempt to use them in lieu of an audible signal) is such that it is virtually line of sight, and is not likely to be noticed under conditions of normal ambient light unless a person happens to be looking directly at the telephone set.

Thus, there is a need in the prior art for an inexpensive light-emitting indicator to alert a person that a ringing signal is present on the telephone line. Furthermore, it is highly desirable to provide such an indicator which will produce a light output signal which, by flashing pattern and intensity of light output, is likely to attract the attention of a person even if they are not looking directly at the phone and are in a location with normal ambient light. Similarly, the visibility of the signal from such a flasher in another room, when there is no direct line of sight to the light-emitting device, is a highly desirable property which has not been present to any appreciable degree in the prior art.

Lastly, such a device should be powered from the telephone line and thus be strictly an add-on device requiring no external source of power such as a 120 volt AC line or batteries.

SUMMARY OF THE INVENTION

The present invention provides a telephone line powered light-emitting flasher, responsive to the presence of a ringing signal on the telephone line, which meets all of the above-stated objectives. In particular, the present invention provides a device responsive to detection of a ringing signal on a telephone line which provides extremely high energy bursts of light output when a ringing signal is present. Furthermore, the present invention provides an output which is quite usable by both deaf persons and persons of normal hearing in environments of normal ambient light, which experiments have shown will attract the attention of the user in such an environment even if the user is not looking at the light source.

The present invention further accomplishes these ends by providing such a device which is powered solely from the electrical energy available in a conventional telephone ringing signal without unduly loading the line. Thus, the invention provides line powered flashing ringing indicators which are powered solely from the telephone line which can meet the requirements of Part 68 of the Rules of the Federal Communications Commission in this country and may be used, without modification, on most telephone systems in Europe.

The present invention comprises a rectification and charging circuit which is preferably capacitively coupled to the telephone line to charge a storage capacitor in the presence of a ringing signal. The preferred form of this arrangement includes a voltage multiplying-type rectifier which, in what the inventor believes to be the best mode of the invention, is a voltage doubler. The storage capacitor is connected to a gas-filled tube, which is preferably filled with xenon gas and is of the type conventionally used in electronic flash attachments for cameras. The tube is excited through the use of a high voltage pulse transformer of the same type used in electronic photo flashes.

To these two elements is connected a triggering circuit. The triggering circuit includes timing elements, preferably implemented with an RC circuit, which controls the voltage at a particular point until it reaches the triggering voltage.

An important aspect of the discovery made in connection with building the present invention is that a flashing high-intensity light output which has a repetition rate of several flashes during the intervals of application of a ring signal is most effective in drawing the attention of a person, even in the presence of normal ambient light.

The basic problem encountered in designing the circuit of the present invention was how to provide sufficient energy on the charge storage capacitor in a manner which is rapid enough to allow the capacitor to be discharged at the desired repetition rate, and which did not unduly load the telephone line so as to make the ringer equivalance of the circuit too high so that it cannot be practically or legally connected to telephone lines.

The preferred form of the present invention uses a voltage doubling rectifier characterized by a changing time constant on the order of a few milliseconds. This satisfies one of the foregoing criteria in that a time constant associated with the timing circuit in the triggering apparatus which causes triggering at a rate of between ½ and 3 Hz, can be made which meets all the foregoing limitations.

Thus, it is an object of the present invention to provide a light-emitting ringing indicator for use with a telephone circuit which is powered solely from the telephone line and provides very high intensity flashes of light output.

It is a further object of the present invention to provide such a circuit with an acceptable ringer equivalance so that the telephone line is not unduly loaded and which may readily be distributed strictly as an add-on device.

It is a further object of the present invention to provide such a circuit inexpensively, and therefore use of a minimal number of parts to accomplish this end is one of the principal objects of the present invention.

It is a further object of the present invention to provide a light-emitting ringing indicator for use with a telephone which has a light output characterized by an intensity and a flashing pattern which will draw the attention of a person under conditions of normal ambient light even when the person has their back turned to the apparatus.

That the present invention accomplishes these objects and overcomes the limitations of the prior art noted above, will be appreciated by the detailed description below.

DETAILED DESCRIPTION

Figure 1:
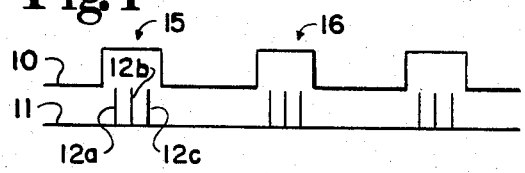
FIG. 1 is a timing diagram showing a representation of the pulse repetition rate of the flashes in the preferred embodiment against a signal representing the on/off duty cycle pattern for a typical ringing signal in the United States.

Turning to the drawing figures, the preferred embodiment of the present invention will now be described. Turning first to FIG. 1, the flash repetition rate, as a function of on/off duty cycle for the ringing signal, which the inventor has discovered to be most effective at drawing the attention of the user is diagrammatically illustrated. The line shown as 10 represents the familiar two-seconds-on/four-seconds-off pattern for subscriber line ringing signals commonly used in the United States. The principles described herein apply to other ringing signal on/off patterns, such as one-second-on/three-seconds-off commonly used in Centrex installations and the short-short-long pattern commonly used in England and other commonwealth countries. The line shown as 11 diagrammatically represents the light output of the flasher circuit. A plurality of spikes 12a-12c show the occurrence of three light flash outputs during the two-second-on period indicated at 15.

Without belaboring the point, it may be seen that four flashes are provided during the ringing on portion of a ring signal shown at 16. This illustration is provided to demonstrate the inventor's discovery that, for conventional two-seconds-on/four-seconds-off ringing patterns, provision of three to four flashes per on interval has been found to be most effective in attracting the attention of the user.

Of course other flash repetition rates may be used within the scope of the present invention and it should be understood that selection of the flash repetition rate is limited at the extremes by (a) the patience of the calling party since it is possible to require an inordinate number of ringing on intervals before a light output is triggered, and (b) the rate at which the energy available in the ringing signal can charge the storage capacitor with sufficient energy to provide an adequate light output.

Figure 2:
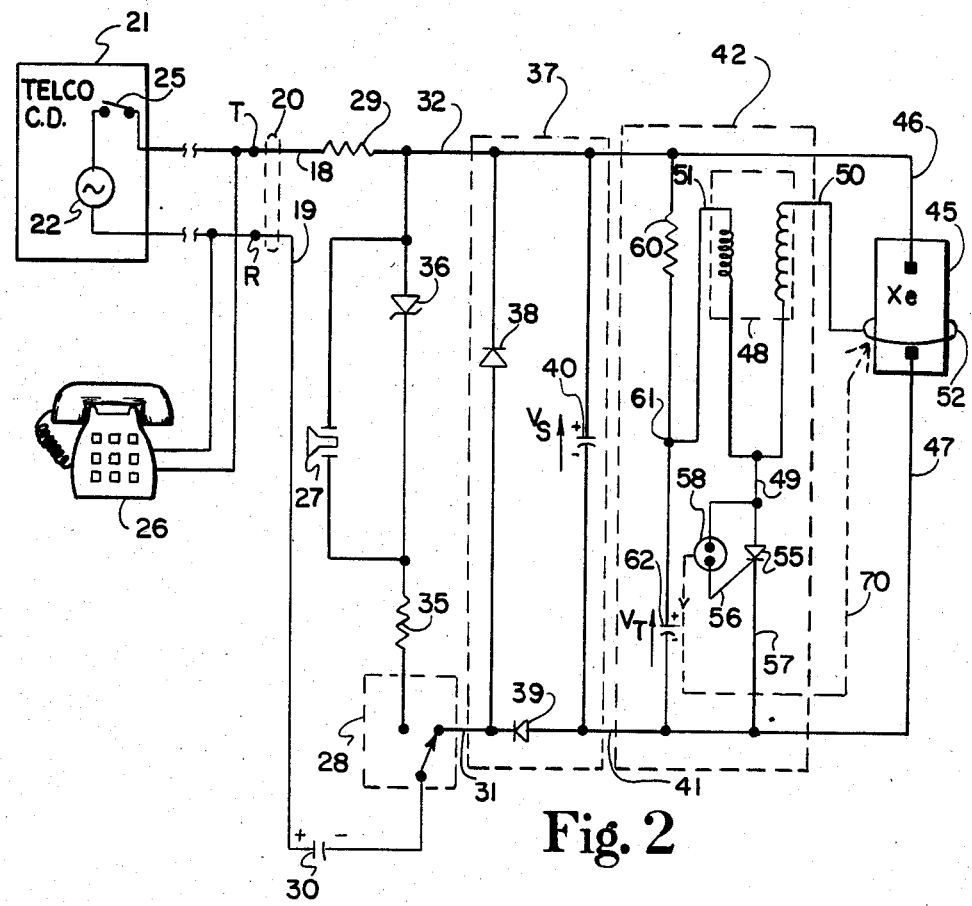
FIG. 2 is a schematic diagram of the preferred embodiment of the present invention.

Turning next to FIG. 2, a schematic diagram of the preferred embodiment is shown. As indicated above, the present invention is connected to the tip and ring conductors of a telephone line shown as 20. Tip conductor 18 and ring conductor 19 form the well known leads of this circuit. The preferred embodiment is adapted to be connected to a conventional subscriber line 20 provided from a typical telephone company central office 21. A source of AC ringing voltage is shown at 22. It will be appreciated by those skilled in the art that this is typically (in the United States) a signal composed of two frequencies on the order of 400 Hz which differ by approximately 40 Hz. Alternately a 420 or 500 Hz signal will be modulated by a 40 Hz tone. The magnitude of the open circuit voltage of ringing signals in the United States varies and is on the order of 100 to 180 volts.

Other ringing signal generators are used throughout the world, but typically average voltage values in excess of 80 volts are used to ring telephones. A switch shown as 25 represents circuitry for connecting and disconnecting ringing generator 22 to telephone line 20. Also connected to telephone line 20 is a telephone set 26. This is shown to indicate that the present invention may be simply connected in parallel to telephone subscriber line 20 as an add-on device. It should be noted that the present invention may be used anywhere there is access to the subscriber line, and proximity to a telephone set is not required.

However, it has been found that the ringer equivalance for the preferred embodiment, while clearly acceptable, is somewhat high, and thus it is preferred, when using the present invention, to disconnect the normal ringer associated with telephone set 26. Needless to say, if one desires the option to switch between audible and visual ring indicators, it is necessary to provide some way of defeating or selectively defeating the normal ringer associated with a typical telephone set 26.

To this end, the inventor believes that the best mode of practicing the present invention is one in which the normal ringer on telephone set 26 is disconnected and a switch selectable audible ringer is also provided in conjunction with an embodiment of the present invention. In the preferred embodiment this is shown as chirp ringer 27 which is selectable by means of switch 28. Before discussing the embodiment of the present invention in detail, it should be noted that when switch 28 is thrown to its left-hand position (the position not shown in the drawing) chirp ringer 27 is connected across telephone line 20 through resistance 29 and capacitor 30. Since, under these circumstances, line 31 is disconnected from the telephone line, it can be seen that circuitry to the right of a port defined by lines 31 and 32 is out of the circuit.

Thus, when a ringing signal is present on telephone line 20, it is capacitively coupled through capacitor 30 and an AC circuit loop is completed through resistors 29 and 35. Chirp ringer 27 is shunted by zener diode 36 which will shunt current around chirp ringer 27 during the portion of the AC ringing cycle in which the tip lead is positive with respect to ring. The zener diode will limit the voltage across chirp ringer 27 when the opposite polarity is present.

The value of resistor 35 and the zener voltage value for diode 36 are matters of choice dictated by the particular device embodying chirp ringer 27.

Turning next to the embodiment of the present invention, the following discussion assumes that switch 28 is in the position shown in the drawing, thus connecting ring lead 19 to line 31. Therefore, telephone line 20 is connected to the input port of the preferred embodiment defined by lines 31 and 32. The first element of the present invention encountered is a rectification and charging apparatus shown surrounded by dashed line 37. This apparatus includes diodes 38 and 39 which rectify current into the input port for the charging of storage capacitor 40.

Those skilled in the art will recognize the arrangement of these three elements as a voltage doubling rectifier. Thus, the steady state value to which storage capacitor 40 is charged is approximately twice the peak value of the AC voltage presented to the input port across telephone line 20. It should be noted that the input of voltage doubler 37 is coupled through capacitor 30 and resistor 29 and thus resistor 29, capacitor 30 and capacitor 40 determine a charging time constant associated with the charging of storage capacitor 40. In the preferred embodiment, capacitors 30 and 40 are of equal value and thus the time constant associated with charging of capacitor 40 is equal to the product of the value of resistance 29 and one-half of the value of each capacitor. Of course, other combinations for these two capacitances may be selected within the scope of the present invention.

As was noted above, one of the problems encountered by the inventor in creating the present invention was how to get sufficient energy stored in capacitor 40, which necessitated selecting a capacitor of reasonable size and applying enough voltage across it, by obtaining charge only from the energy transmitted down telephone line 20 by the ringing signal. As may be seen from FIG. 2, a voltage doubling rectifier was selected, but of course other voltage multiplying rectifier arrangements may be used within the scope of the present invention. However, since it is important to charge capacitor 40 in a manner so that there is enough stored energy within the capacitor, the selection of a voltage doubler in connection with the rectification and charging apparatus 37 is preferred.

Proceeding to the right-hand side of storage capacitor 40, it may be seen that line 31 extends as line 41 on the anode side of diode 39.

The balance of the circuitry of the preferred embodiment includes triggering circuit 42 and xenon flash tube 45. Xenon flash tube 45 is preferably embodied by a xenon-filled light-emitting tube element of the type commonly used in connection with electronic flash units for cameras. It is preferred that such tubes used in embodiments of the present invention be equipped with a reflector. As is known to those skilled in the art, such tubes emit light when xenon gas within the tube becomes ionized and a current is conducted through the tube between its terminal 46 and 47. The use of xenon tubes for the gas-filled light-emitting tube element of the present invention is preferred because the spectral content of current conducting ionized zenon has a large output of white light.

The voltage on storage capacitor 40 is applied between terminals 46 and 47 of tube 45 in a conventional manner. When the gas within the tube ionizes, energy stored in capacitor 40 is quickly dumped through tube 45 and the total energy stored within the capacitor determines the intensity of the light pulse provided. As is further known to those skilled in the art, the value of capacitor 40 and the resistance and inductance of the discharge circuit (including tube 45) determines the duration of the flash. As may be seen from inspection of FIG. 2, the preferred embodiment is one in which the only resistance present is the on resistance of tube 45 when the gas within it becomes ionized and thus the self inductance of the tube and the physical wires embodying lines 32 and 41 (together with the value of capacitor 40) determine the flash duration. As will be appreciated by those skilled in the art, the preferred embodiment shown in FIG. 2 is one for which very short flashes of high intensity light will be provided.

The excitation of tube 45 is accomplished through a high voltage pulse transformer 48 of the type normally used for this purpose in connection with electronic photo flashes. The two windings of transformer 48 are brought together at a common terminal 49, with the secondary of the transformer appearing across a port defined by terminal 49 and line 50, and the primary coil appearing between terminal 49 and line 51. As will be known to those skilled in the art, this type of transformer is provided with a very high turns ratio so that the application of a few hundred volts to the primary side will produce an output voltage on the secondary on the order of 5 to 7.5 kilovolts.

Line 50 from the secondary of transformer 48 is connected to a conventional ring electrode 52 surrounding tube 45 and physically located near terminal 47 of the tube. This is the arrangement whereby tube 45 becomes excited by ionizing the gas within the tube. When a high voltage pulse, in excess of 5,000 volts, is provided between lines 41 and 50, a very intense electric field is created between ring electrode 52 and electrode 47 of tube 45. The electric field strength is sufficient to cause ionization of the xenon gas within the tube. Once this is accomplished, the voltage appearing across capacitor 40 is sufficient to drive a surge of current through the ionized gas within the tube between terminals 46 and 47, thus causing a somewhat dramatic flash of light to appear. When capacitor 40 has been sufficiently discharged, the voltage between terminals 46 and 47 is no longer adequate to maintain the ionized state of the xenon gas and the electrons rejoin the atoms of the gas, bringing the circuit back to a quiescent state.

A silicon controlled rectifier (SCR) 55 controls current through pulse transformer 48. SCR 55 has a gate terminal 56 and its anode is connected to line 49. The cathode 57 of SCR 55 is connected to line 41. The anode to gate circuit around SCR 55, in the preferred embodiment, consists of a neon bulb 58. In the preferred embodiment, bulb 58 is preferably a type NE-2 bulb, but other gas filled tube elements may be used to embody this element of the triggering circuit.

As is known to those skilled in the art, as the voltage between anode terminal 49 and cathode terminal 57 rises, gate terminal 56 remains one to two volts above the potential of the cathode 57. Thus, as the gate to anode voltage increases, the point will be reached at which neon tube 58 will break down causing a pulse of current to be delivered into gate terminal 56. This causes SCR 55 to fire. When SCR 55 fires, a surge of current is provided from capacitor 62, through line 51, to the primary of transformer 48. This surge causes the corresponding high voltage pulse to appear on the secondary of the transformer while the current continues through terminal 49 and SCR 55.

It will be readily appreciated from inspection of FIG. 2 that the above-referenced anode voltage will in fact be the voltage present at point 61 between resistor 60 and capacitor 62. Since it may be assumed for the moment that capacitor 40 is charging with an associated time constant on the order of a few milliseconds, it will be understood that the primary of transformer 48, for practical purposes, appears to be a short circuit. Thus, the voltage at point 61 effectively is equal to the voltage at point 49, the anode of SCR 55.

Assuming for a moment an initial condition of discharge for storage capacitor 40, the voltage at point 61 begins at zero. As the voltage across capacitor 40 increases, current will begin to flow through the timing circuit consisting of resistor 60 and capacitor 62. Under these conditions, SCR 55 is cut off and thus the rate of charging of capacitor 62 depends upon the time constant defined by the values of resistor 60 and capacitor.

In order to appreciate the following discussion, it is appropriate to provide the following table showing the values of components used in the preferred embodiment. In the table below, resistance values are given in ohms and capacitance values are in microfarads.

TABLE

| Reference Numeral | Value or Type |
|---|---|
| 29 | 400 (¼ watt) |
| 30 | 10 |
| 38 | 1N 4007 |
| 39 | 1N 4007 |
| 40 | 10 |
| 60 | 3.3 M |
| 62 | 0.22 |

From the foregoing values, it may readily be appreciated that charging of storage capacitor 40 from the ringing signal present on telephone line 20 occurs at a rate determined by a time constant on the order of 2–4 milliseconds. From the values of resistor 60 and capacitor 62, the time constant associated with the voltage rise at point 61 is on the order of 725 milliseconds.

Thus the time constants and impedance presented by the elements of the preferred embodiment have the following characteristics. First, the time constant associated with the charging of storage capacitor 40 is much less than the time constant controlling the rise of voltage at point 61. The input impedance to the circuit as it is connected to telephone line 20 is such as to not unduly load the line which may cause false ring trip. Keeping in mind that conventional telephone ringing signals are normally mixtures of signals on the order of 400 Hz with strong intermodulation products below 100 Hz and the following characteristics of the input impedance may be appreciated. For the 400 Hz components, resistor 29 will dominate the input impedance, the capacitive elements contributing approximately 80 ohms. Thus the input impedance to the circuit for these frequencies is on the order of 480 ohms. When one considers the low frequency of the intermodulation envelope for a ringing signal, the impedance rises to a value on the order of approximately 2 kilohms.

Of course, this impedance is shunted by the series combination of resistance 16 and capacitance 62 but since resistor 60 is in excess of a megohm, thus shunting impedance can be ignored.

Thus, the input impedance to the circuit for the frequencies of common ringing signals is not too low. In practice, the inventor has determined that the preferred embodiment presents a ringer equivalence of approximately 1.75 db and thus appears to the telephone line to be the equivalent of slightly less than two telephone sets attached to the subscriber line.

Figure 3:
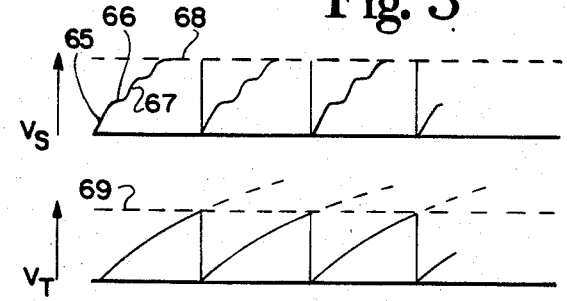
FIG. 3 is a diagram representing the charging rate of the storage capacitor versus the charging rate on the timing apparatus within the trigger circuit of an embodiment of the present invention.

The time constant determined by timing elements 60 and 62 is on the order of 750 milliseconds. Thus, it will be appreciated that the selection of time constants in constructing preferred forms of the present invention is such that the time constant associated with the voltage rise of point 61 should be at least five times greater than the time constant associated with the charging of storage capacitor 40. This arrangement is graphically illustrated in FIG. 3. In FIG. 3, the voltage Vs across storage capacitor 40 is shown. Also shown is the trigger voltage Vt between line 41 and point 61. A first charging segment shown as 65 represents the initial charging of capacitor 40 on a portion of the ringing voltage in which the tip conductor is positive with respect to the ring conductor. A break point is shown at 66 where the slope of the positive portion of the ringing voltage changes. A second portion shown as 67 occurs when capacitor 40 begins to further charge, under the control of diodes 38 and 39, during the negative portion of the ringing voltage. From the exemplary slopes of segments 65 and 67, it may be appreciated that charging of this capacitor takes place rapidly. The capacitor relatively rapidly reaches a stead state condition of charging represented by dashed line 68. Note that the 2 millisecond time constant for the charging of capacitor 40 is on the order of the period for the 400 Hz components of the ringing signal.

It should be understood that in practice, the voltage across capacitor 40 may have a sharper rising edge than that shown in FIG. 3. Thus, it should be appreciated that the time scale in connection with voltage Vs as shown in FIG. 3 may be somewhat expanded.

The representation of voltage Vt on FIG. 3 shows the familiar exponential rise of the voltage at point 61 until a predetermined triggering voltage level, shown at 69, is reached. It should be understood that the waveform present at this point is not a pure mathematical exponential since, during the initial charging of capacitor 62, the voltage across storage capacitor 40 is rising with time.

However, it should be understood that the three exemplary cycles of charge and discharge represented in FIG. 3 occur during one exemplary on period of the ringing voltage, such as period 15 shown in FIG. 1. Therefore, an important aspect of the discovery made by the present inventor is the fact that multiple flashes during the time period one normally associates with an on portion of the ringing cycle are very effective in drawing the attention of someone in the vicinity of the flashing device. To practically implement this discovery, the present invention provides multiple charging and discharging cycles within a conventional on period portion of the ringing cycle illustrated in FIG. 1.

From the foregoing it will be appreciated that elements 60 and 62 define a characteristic time constant which controls the rate of charge at point 61. It will further be appreciated that this particular time constant is at least five times greater than the time constant associated with the charging of storage capacitor 40.

Naturally, when the voltage at point 61 reaches a level sufficient to ionize the gas within neon bulb 58, the pulse of current into the gate (or control) terminal of SCR 55 causes the SCR to fire, pulling a surge of current through primary transformer 51. The energy stored in capacitor 62 is sufficient to allow current in the inductive load represented by the primary of transformer 48 to rise, and thus SCR 55 will remain on for a sufficient period of time to prevent premature cut off. Thus, a triggering pulse appears across the secondary of the transformer. When sufficient voltage is developed between terminals 52 and 47, xenon tube 45 breaks down and the energy from capacitor 40 is quickly dumped into the tube causing the flash of light.

Thus, capacitor 40 will discharge extremely rapidly until the ionized state of the gas within tube 45 terminates, thus reestablishing the charging cycle shown in FIG. 3. Due to the relative values of the time constants, capacitor 40 will charge to its steady state of charging relatively quickly, and capacitor 62 will commence charging at a slower rate until the next time the triggering point for the SCR trigger circuit is reached.

As noted above, it is a primary object of the present invention to provide a circuit which can be built as cheaply as possible. There is a limited amount of energy available in the ringing signal in the telephone line. Considering the constraints of not unduly lowering the input impedance to the circuit, and the need to fire the flash tube multiple times during a ringing cycle, the inventor has also constructed an embodiment of the invention using a 5,000 volt transformer for pulse transformer 48 rather than the preferred 7.5 Kv device. Under these circumstances, the inventor determined that xenon tube 45 would not dependably fire under ambient lighting conditions of extreme darkness. However, this problem was overcome by placing neon tube 50 in close proximity to xenon tube 45 such that the two were optically coupled as represented by dashed line 70.

In connection with this particular discovery, the inventor first noticed the phenomenon when an embodiment of the present invention failed to operate at all in a room which was totally darkened. Realizing that, in theory, the state of current through the normal 120 volt power distribution system within the room should not affect conditions on the telephone line, he experimented to discover the cause. It was at this point that the inventor illuminated the circuit embodying the present invention with a conventional flashlight and, in the presence of a telephone ringing signal, the circuit again started functioning properly. Subsequently, the element corresponding to neon tube 50 was placed so as to be optically coupled to the xenon tube, as described above.

It is the inventor's belief that the provision of photons from neon tube 58 assisted the onset of ionization of xenon gas and thus this arrangement may be used as an expedient to lower the potential between terminals 47 and 52 which is necessary to excite tube 45 in conditions of extreme darkness. However, the inventor believes that the best mode of constructing a circuit is one in which this expedient in not necessary.

It should be appreciated by those skilled in the art that when the telephone is on-hook and no ringing signal is present, the voltage across storage capacitor will be approximately one-half of the DC voltage present between the tip and ring leads of telephone line 20. In the preferred embodiment, tube 45 and SCR 55 will virtually be open circuits and lines 32 and 41 will be connected by a capacitance equal to the sum of the values of capacitors 40 and 62. Clearly the value of capacitor 40 will dominate this combination. The telephone line 20 will see the series combination of capacitor 40 (ignoring 62) and capacitor 30. Since, in the preferred embodiment, these two are of substantially equal value, voltage will be equally divided between them and thus the initial condition for capacitor 40 will be approximately one-half the quiescent open circuit voltage present on the line.

It should also be appreciated that SCR 55 is one which must be able to withstand reverse blocking voltages on the order of magnitude of the expected voltage appearing across storage capacitor 40. Since a nominal average value for ringing voltage on telephone line in the United States is on the order of 130 volts, capacitor 40 will be charging to a value on the order of 260 volts. Thus, the preferred embodiment uses an SCR 55 which is rated for at least a 400 volt reverse blocking voltage.

Of course, other devices may be subsituted for neon lamp 58 in the triggering circuit. However, the lamp is less expensive than a plurality of zener diodes, even one or two very high voltage types. Also, it is believed that neon bulbs are less prone to failure than zener diodes in this relatively high voltage application.

From the foregoing it will be appreciated that the present invention overcomes the aforementioned shortcomings in the prior art and that it accomplishes the objects of the invention set forth above. The circuit shown in FIG. 2 and described above is the preferred embodiment of the present invention and what the inventor believes to constitute the best mode of practicing the invention. Of course, as a result of the foregoing description, other embodiments of the present invention will suggest themselves to those skilled in the art, so the scope of the present invention is to be limited only to by the claims below.

I claim:

1. A telephone line powered flasher circuit responsive to a ringing signal on said telephone line comprising in combination:
    coupling and rectification means having a characteristic first time constant connected to said telephone line, including means capacitively coupling a diode rectifier to said telephone lines for charging a storage capacitor in response to the provision of said ringing signal on said telephone line;
    a gas-filled light-emitting tube connected to said storage capacitor;
    triggering means connected to said gas-filled light-emitting tube and said storage capacitor for causing said tube to conduct in response to said charging of said storage capacitor, said triggering means including a pulse transformer having a secondary winding connected to said tube and a primary winding connected to a switching device, said switching device being triggered by the presence of a predetermined voltage at a first point; and
    a resistance-capacitance circuit, characterized by a second time constant, connected to said first point and to said storage capacitor for controlling the rate of change of voltage at said first point, said second time constant being at least five times greater than said first time constant;
    whereby said tube is caused to flash in response to said provision of said ringing signal on said telephone line.

2. A flasher circuit as recited in claim 1 wherein said gas-filled light-emitting tube is a xenon filled tube.

3. A flasher circuit as recited in claim 1 wherein said switching device is a thyristor including a control terminal and said gas-filled light-emitting tube is a first gas filled tube; and;
    wherein said triggering means further includes a second gas-filled tube connected to said control terminal for producing a triggering signal to said control terminal in response to said voltage at said first point reaching a predetermined value.

4. A flasher circuit as recited in claim 3 wherein said second gas-filled tube is a second gas-filled light-emitting tube and said first tube is optically coupled to said second tube.

5. A flasher circuit as recited in claim 1 wherein said coupling and rectification means includes a voltage multiplier circuit.

6. A flasher circuit as recited in claim 5 wherein said voltage multiplier circuit is a voltage doubler circuit.

7. A telephone line powered flasher circuit responsive to the presence of a ringing signal on said telephone line comprising in combination:
    a coupling and rectification circuit for connecting said telephone line to a storage capacitor and for charging said storage capacitor at a predetermined time constant in response to said ringing signal;
    a gas-filled light-emitting tube connected to said storage capacitor and to a triggering device, said triggering device being triggered in response to a predetermined signal level at a signal point;
    timing means connected to said storage capacitor and said signal point for causing said predetermined signal level to be present at said signal point at a predetermined frequency for a predetermined steady state of charging of said storage capacitor in response to said ringing signal;
    wherein said predetermined time constant is sufficiently small to allow said storage capacitor to reach said steady state of charging in response to said ringing signal at a repetition rate greater than said predetermined frequency.

8. A flasher circuit as recited in claim 7 wherein said predetermined frequency is in the range of 1 Hz to 20 Hz.

9. A flasher circuit as recited in claim 7 wherein said gas-filled light-emitting tube is a xenon-filled tube.

10. A flasher circuit as recited in claim 7 wherein said coupling and rectification circuit includes a voltage doubler.

11. A telephone line powered flasher circuit responsive to the presence of a periodic ringing signal on said telephone line, said ringing signal being characterized by a predetermined ringing frequency with a predetermined ring on time period comprising in combination:
- a coupling and rectification circuit for connecting said telephone line to a storage capacitor and for charging said storage capacitor at a predetermined time constant in response to said ringing signal;
- a gas-filled light-emitting tube connected to said storage capacitor and to a triggering device, said triggering device being triggered in response to a predetermined signal level at a signal point;
- timing means connected to said storage capacitor and said signal point for causing said predetermined signal level to be present at said signal point at a predetermined triggering frequency for a predetermined steady state of charging of said storage capacitor in response to said ringing signal;
- wherein said predetermined time constant is sufficiently small to allow said storage capacitor to reach said steady state of charging in response to said ringing signal at a repetition rate greater than said predetermined triggering frequency and said predetermined triggering frequency is such that said predetermined signal level is reached at said signal point at least twice during said ring on time period.

* * * * *